United States Patent [19]

Crumpacker

[11] 3,956,787
[45] May 18, 1976

[54] THREAD RECONDITIONING TOOL
[76] Inventor: William H. Crumpacker, 1538 School Ave., Walla Walla, Wash. 99362
[22] Filed: Dec. 16, 1974
[21] Appl. No.: 533,082

[52] U.S. Cl. ................................. 10/1 B; 10/113; 10/121; 10/123 S; 408/176
[51] Int. Cl.² ...................... B23G 1/28; B23G 5/10
[58] Field of Search ................. 10/1 B, 89 H, 89 P, 10/113, 121, 123 R, 123 P, 123 S, 129 P, 129 M; 408/173, 174, 176, 184; 29/267, 272, 280

[56] References Cited
UNITED STATES PATENTS

| | | | |
|---|---|---|---|
| 1,392,705 | 10/1921 | Rhodes | 10/123 S |
| 1,545,162 | 7/1925 | Nelson | 10/1 B |
| 1,581,023 | 4/1926 | Saylor | 408/184 |
| 2,224,031 | 12/1940 | Kalbeck | 29/267 |
| 2,700,166 | 1/1955 | McKenzie | 10/1 B |
| 2,718,646 | 9/1955 | McKenzie | 10/121 |

Primary Examiner—C. W. Lanham
Assistant Examiner—E. M. Combs
Attorney, Agent, or Firm—Wells, St. John & Roberts

[57] ABSTRACT

A tool for reconditioning threads on vehicle lug studs. The tool is comprised of a hollow tube slidably receiving a collet chuck. The chuck is operatively connected to a handle that is in turn pivotably mounted to the tube. Pivotal movement of the handle causes responsive movement of the collet chuck between an extended and a retracted position within the tube. The chuck includes internal gripping surfaces having thread cutting serrations thereon. In the extended position, these serrations are separated from one another to enable loose positioning of the collet chuck over a lug stud. The handle is then pivoted to cause corresponding movement of the chuck to the retracted position. As the chuck is retracted into the tube, the gripping surfaces grip the shank between the thread cutting serrations. The tool may then be turned about the axis of the stud to renew or recondition the threads thereon.

3 Claims, 6 Drawing Figures

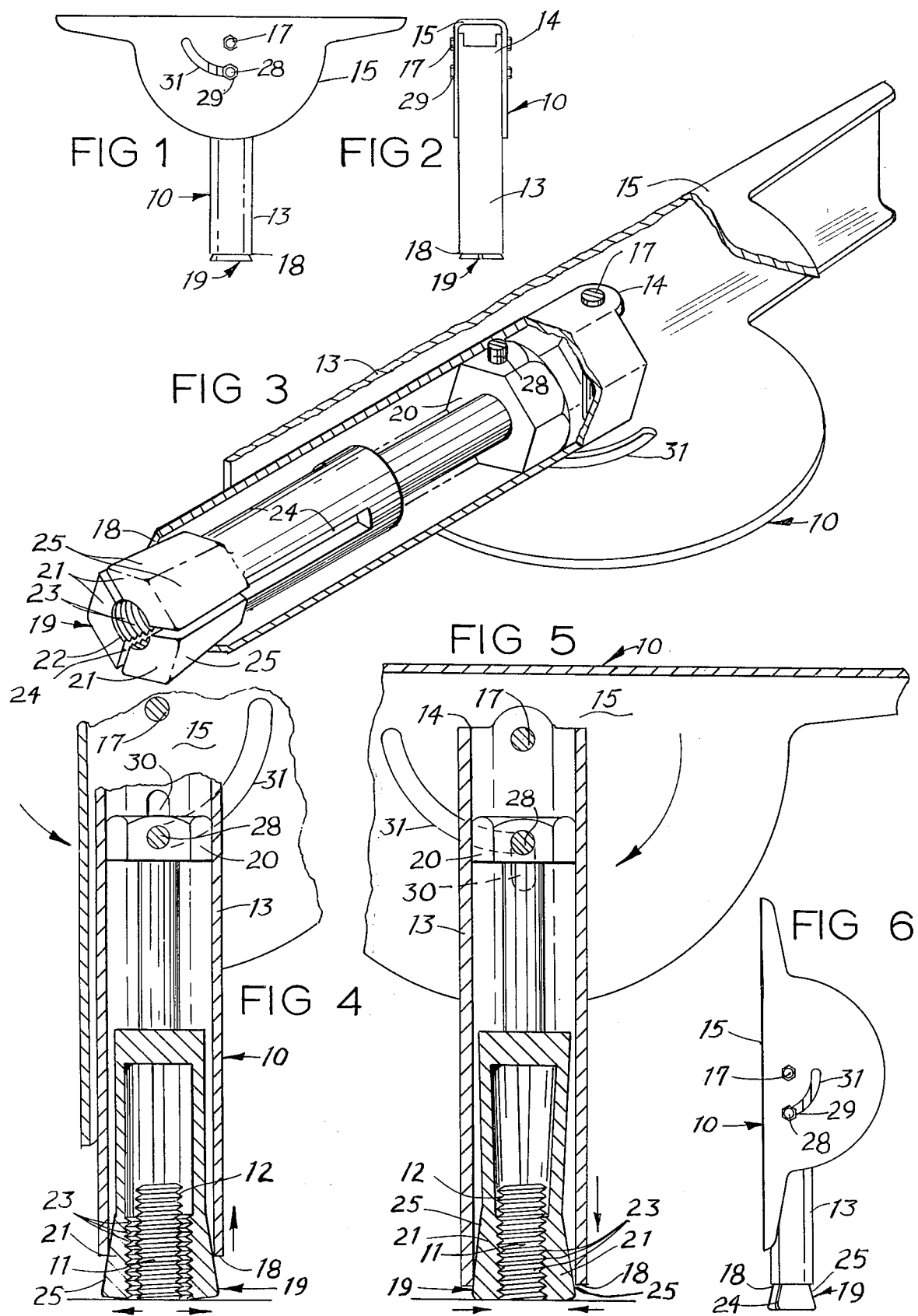

THREAD RECONDITIONING TOOL

BACKGROUND OF THE INVENTION

The present invention relates to thread cutting apparatus and more particularly to tools adapted to recondition male threads.

The lug studs for receiving vehicle wheels are often subjected to damage by placement and removal of the wheels, by rocks, rust and inadvertent cross threading. It is often desirable to renew or recondition the threads of the studs rather than simply replace the studs by removing them from the wheel drum. The replacement procedure is relatively complex since the drum must be removed from the axle to allow removal and replacement of the worn studs. Provision of a tool that would enable one to recondition the studs without removing them from the wheel drum is therefore desirable.

U.S. Pat. No. 2,822,555 to Davis shows an elongated tool with thread members that are assemblable about a bolt shank. The members are engaged by a screw and selectively tightened about the stud shank before the tool is operated to turn about the shank axis to recondition the threads on the shank.

U.S. Pat. Nos. 2,700,166 and 2,718,646 show reconditioning tools having die members that are closed by cam surfaces in response to rotational movement of the tool in a particular direction. The die members loosely ride over the threads on the shank to be reconditioned as the tool is being positioned adjacent the shank base. Then, when the tool is turned in an opposite direction, cams force teeth cutting serrations into the existing teeth to recondition the teeth as the tool is turned or backed off the shank.

U.S. Pat. No. 2,557,609 is simply illustrative of a hub nut of a particular configuration adapted to rethread and peen a lug stud.

The present apparatus utilizes an expandable and retractable chuck that includes thread cutting serrations that separate and contract in response to pivotal movement of the tool handle. The thread cutting serrations may be placed loosely over damaged lug studs to position the serrations adjacent the base of the stud. The handle is them pivoted on the tube to contract the teeth cutting serrations about the stud shank. Rethreading is then accomplished as the handle is operated to turn the tool about the lug stud axis. The device is further adapted to receive collet chucks adapted to accommodate lug studs of different size and/or thread configuration.

SUMMARY OF THE INVENTION

A thread reconditioning tool is described comprising a hollow elongated tube with a handle pivotably mounted to one end thereof. An expandable and contractable collet chuck is slidably held within the tube and protrudes from the remaining tube end. Means is provided to operatively connect the chuck to the handle to effect sliding movement of the chuck within the tube between an extended and a retracted position in response to pivotal movement of the handle on the tube. The chuck includes interconnected internal gripping surfaces having thread cutting serrations thereon. Cooperating means is further provided between the tube and collet chuck for spreading the internal gripping surfaces in response to movement of the chuck to the extended position. The gripping surfaces are spread apart in the extended position by a distance sufficient to enable a stud to be loosely received therebetween. The cooperating means between the tube and collet chuck is also utilized to contract the gripping surfaces together in response to movement of the chuck to the retracted position. The gripping surfaces may therefore be selectively contracted together about the stud to grip the stud between the thread cutting serrations. The tool may then be turned about the axis of the stud to recondition the threads thereon.

It is a first object of the present invention to provide a thread reconditioning tool that is operable to recondition any male threads of a rigidly held shank or stud of a specific size.

An additional object is to provide such a tool that is simple in construction, easy to operate, and inexpensive to manufacture.

A further object is to provide such a tool that is adjustable to accommodate lug studs of different size and/or thread configurations.

These and further objects and advantages will become apparent upon reading the following description which, taken with the accompanying drawings, describes a preferred form of the present invention.

BRIEF DESCRIPTION OF THE DRAWINGS

FIG. 1 is a front elevation view of the thread reconditioning tool;

FIG. 2 is a side elevation view of the tool as seen from the right in FIG. 1;

FIG. 3 is an enlarged fragmentary pictorial view of the thread cutting tool illustrating its elements and their cooperation;

FIG. 4 is a fragmentary section front elevational view showing operation of the present tool;

FIG. 5 is a view similar to FIG. 4 showing a different operational position of the tool; and FIG. 6 is a view similar to FIG. 1 showing a different operational position of the tool and cooperating elements thereof.

DETAILED DESCRIPTION OF THE PREFERRED EMBODIMENT

The present thread reconditioning tool is illustrated in the accompanying drawings and indicated therein by the reference character 10. Tool 10 is intended for use on lug studs of the type illustrated in FIGS. 4 and 5 at 11. Stud 11 includes male screw threads 12 along its length. A particular use for the present tool is to recondition existing damaged threads on similar lug studs presently provided on vehicles for mounting wheels. The threads on such studs often become damaged from removal and mounting of wheels on the wheel drum and by damage from flying rocks or rust from exposure, or from inadvertent cross threading.

Looking in more detail and with particular reference to FIGS. 1 and 2, tool 10 may be seen comprising a hollow hexagonal tube 13 pivotably mounted at end 14 to a handle 15. A pivot pin 17 extends through tube 13 and handle 15 to pivotably mount handle 15 to the tube for movement about a fixed axis perpendicular to the length of the tube.

The hexagonal tube 13 is elongated with an open lower end 18 that slidably receives a collet chuck 19. As seen in FIG. 3, collet chuck 19 includes a hex-head 20 of cross-sectional shape complementary in configuration to the cross-sectional shape of the tube 13. This enables longitudinal sliding movement of the collet chuck within the tube, but prevents relative rotational movement of the chuck and tube about their respective longitudinal axes.

Chuck 19 further includes outwardly projecting interconnected jaws 21 that include inward arcuate gripping surfaces 22 therein. The surfaces 22 each include thread cutting serrations 23 for engaging and reconditioning the threads 12 of stud 11. Chuck 19 includes spaced longitudinal slots 24 that separate the jaws 21 and enable them to move from an expanded condition as shown in FIGS. 3, 4 and 6, to a contracted position as shown in FIGS. 1, 2 and 5. This movement is effected by inclined cam surfaces 25 provided on chuck 19 outwardly adjacent the gripping surfaces 22. Inclined cam surfaces 25 are adapted to engage and slide over the tube end 18. As shown in FIGS. 4 and 5, retracting movement of collet chuck 19 into tube 13 results in contraction of gripping surfaces 22 to bring the thread cutting serrations 23 against threads 12.

Movement of chuck 19 between the retracted and extended positions is effected in response to pivotal movement of handle 15 on tube 13. Handle 15 includes opposed arcuate slot cams 31 formed about common centers that are spaced from the axis of pivot pin 17. The centers are located so that opposite ends of the cams are located different radial distances from the axis of pin 17.

Slot cams 31 slidably receive opposed ends of a slide follower in the form of a bolt 28. Bolt 28 extends from a head portion adjacent a slot cam 31 on one side of handle 15, through tube 13 and chuck 19 to a slot cam 31 on the other handle side where it threadably receives a retaining nut 29. Longitudinal slots 30 are provided in tube 13 to slidably receive bolt 28 and permit longitudinal movement of chuck 19 therein.

Bolt 28 may be selectively disengaged from the tool to enable removal of collet chuck 19 from tube 13. Through this provision, several collet chucks adapted for reconditioning different stud sizes and threads may be interchangeably mounted within tube 13.

As handle 15 is pivoted on tube 13, the slot cams 31 slide over bolt 28. The arcuate surfaces of slot cams 31 work against bolt 28 to move chuck 19 longitudinally within tube 13 as the distance from pin 17 to bolt 28 changes due to the offset cam centers. As chuck 19 moves within tube 13, cam surfaces 23 on chuck 19 move relative to open tube end 18. Tube end 18 operates against the cam surfaces 23 to expand or contract the gripping surfaces 22.

The slot cams 31 are arcuate with their centers located adjacent pivot pin 17 at a location so the handle and tube are substantially parallel to one another when the collet chuck is in the extended position (FIGS. 3, 4 and 6), and so the handle 15 is located substantially perpendicular to the tube 13 when collet chuck 19 is located in the retracted position (FIGS. 1, 2 and 5).

In operation, gripping surfaces 22 are initially positioned over a stud 11 while the collet is in the extended position and handle 15 is parallel to tube 13. This condition is illustrated by FIG. 4. Once gripping surfaces 22 are located at the base of stud 11 and against the supporting surface, the handle 15 may be pivoted to a position substantially perpendicular to tube 13. This movement operates slot cams 31 against bolt 28 to cause the collet chuck 19 to move to the retracted position, pulling the cam surfaces 25 inwardly against tube end 18 and contracting the thread cutting serrations 23 against threads 12 of shank 11. Once in this position, the tool may be rotated about the axis of the stud simply by applying turning force to the handle. The direction of rotation is identical to that required to remove a nut from the stud (usually a counterclockwise movement). During this turning movement, serrations 25 operate to recondition the existing threads 12 either by rethreading or removing impacted dirt or rust from the grooves.

The above description and attached drawings are presented by way of example and are not intended to restrict the scope of this invention. Only the following claims are to be taken as definitions of the present invention.

What I claim is:

1. A stud thread reconditioning tool, comprising:
   an elongated hollow tube having an opening continuous along its length;
   a handle mounted to one end of the tube for movement thereon about a pivot axis transverse to the tube;
   an expandable and retractable collet chuck having a cross section complementary to the tube opening and longitudinally slidably carried within the tube with one end projecting from a remaining tube end;
   a longitudinal guide slot formed within the tube;
   a follower pin on the collet chuck projecting outwardly therefrom through the slot;
   an arcuate slot cam means formed within the handle slidably receiving the follower pin for moving the collet chuck longitudinally within the tube between an extended and a retracted position within the tube;
   interconnected jaws on the collet chuck spaced apart about a central stud receiving opening by longitudinal slots formed in the collet chuck, each jaw including interior thread cutting surfaces;
   each jaw further having an exterior cam surface extending outward from the remaining end of the tube, said cam surface tapering longitudinally from a reduced cross section located within the tube and of a dimension smaller than the cross sectional dimension of the tube opening to an enlarged cross section outward of the remaining end of the tube of greater cross sectional dimension than the tube opening, the respective cam surfaces of the jaws being in engagement with the remaining end of the tube so that as the chuck is drawn to the retracted position the cam surfaces will slide against the remaining end of the tube and thereby force the jaws radially together and as the chuck is moved to the extended position the cam surfaces will slide against the remaining end of the tube and thereby allow the jaws to move radially apart.

2. The stud thread reconditioning tool as recited in claim 1 wherein:
   said opening is polygonal in cross section;
   said chuck being complementary in cross section to the polygonal cross section of said opening to facilitate sliding movement therein but prevent relative rotation of the chuck within the tube.

3. The shank thread reconditioning tool as recited in claim 1 wherein the follower is a bolt slidably engaging the slot cam and removably mounted to the collet chuck to facilitate removal of said collet chuck from said tube and enable exchange with a collet chuck adapted to receive and recondition threads of a different size.

* * * * *